Dec. 1, 1942.  C. B. KURTZ  2,303,562
CONTROL MECHANISM
Filed July 15, 1940  2 Sheets-Sheet 1
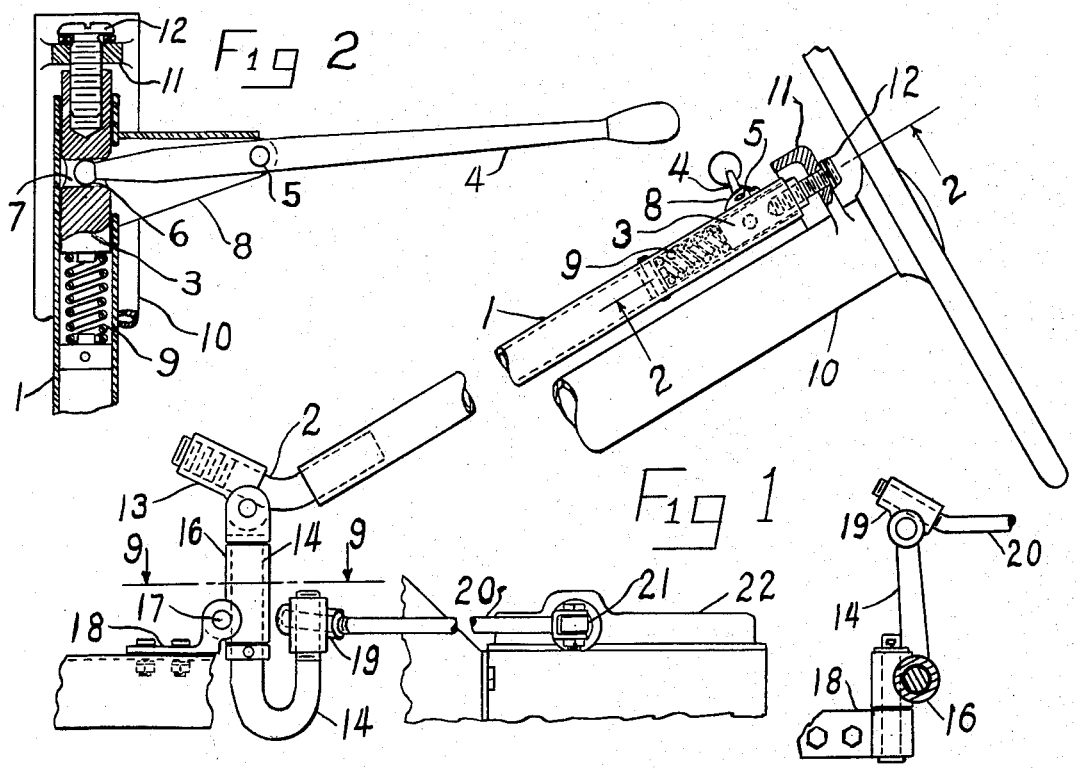
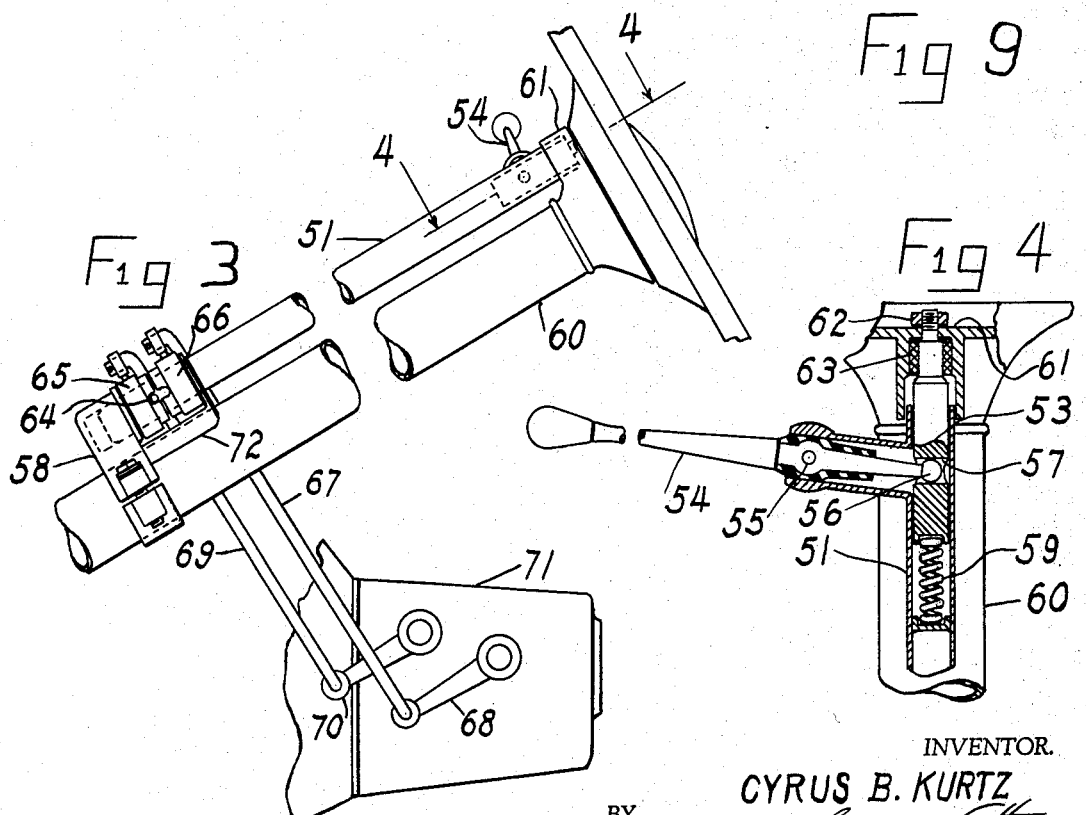
INVENTOR.
CYRUS B. KURTZ
BY
ATTORNEYS Dec. 1, 1942.  C. B. KURTZ  2,303,562
CONTROL MECHANISM
Filed July 15, 1940  2 Sheets-Sheet 2
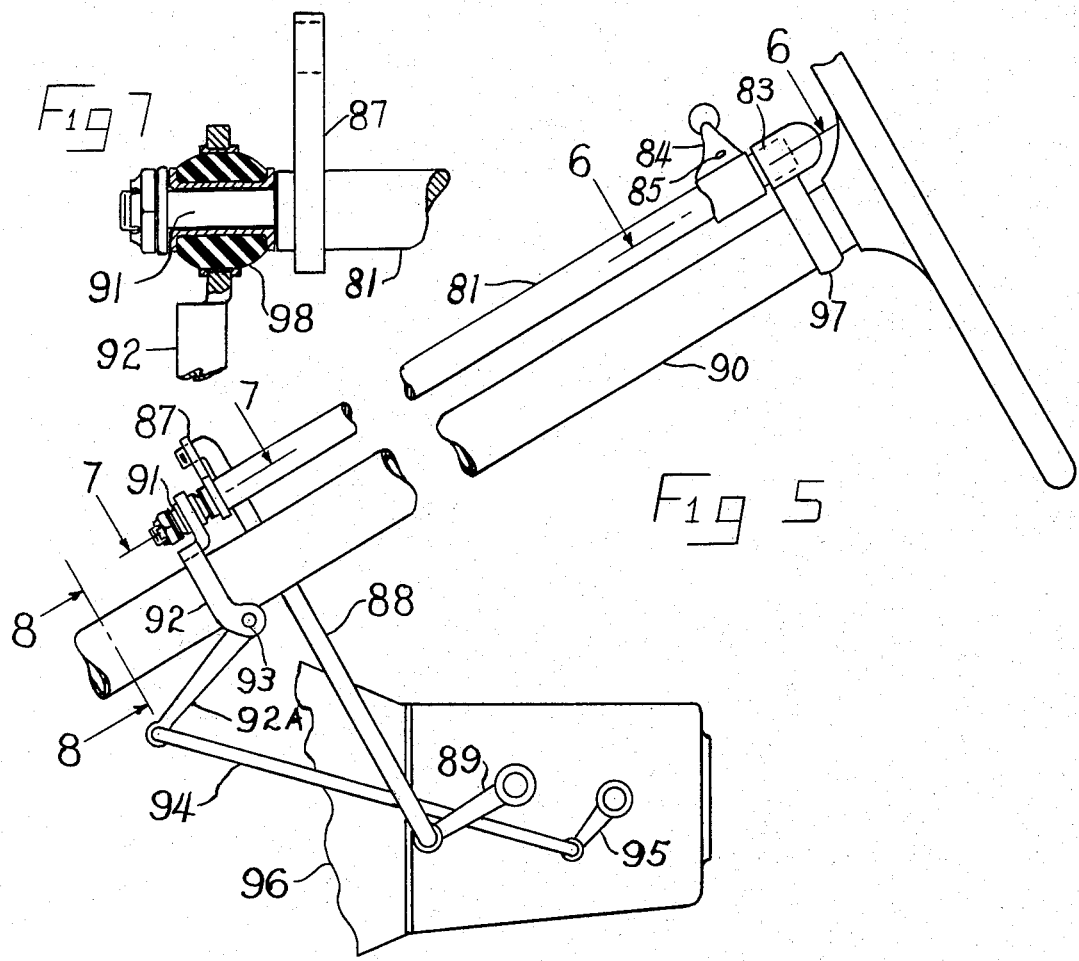
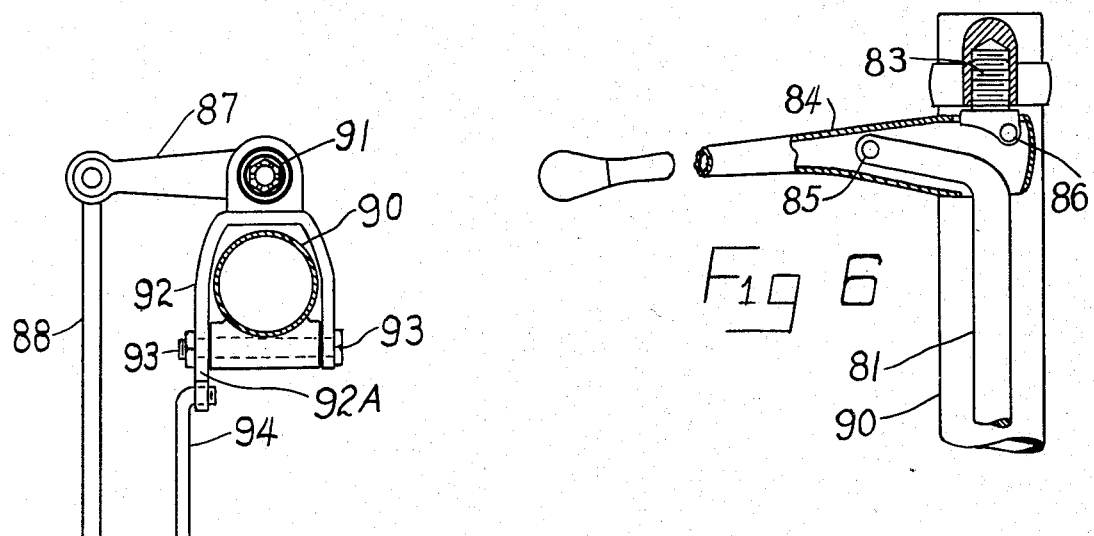
INVENTOR.
CYRUS B. KURTZ
BY
Ridley T Watts
ATTORNEYS Patented Dec. 1, 1942

2,303,562

UNITED STATES PATENT OFFICE 2,303,562

CONTROL MECHANISM

Cyrus B. Kurtz, Lakeside, Ohio

Application July 15, 1940, Serial No. 345,507

8 Claims. (Cl. 74—484)

This invention relates to control mechanism for motor vehicles and is referred to as the "remote control" type.

In motor vehicle construction it is common practice to build the transmission in as one part integral with the engine unit and, then, mount the engine unit to oscillate and move on rubber supports in the frame or body unit. This practice has greatly reduced the motor vibration and impulse shocks transmitted to the body unit and passengers themselves, but this engine unit movement has set up objectionable and dangerous whipping around of the long gear-shift lever which is mounted on the transmission and extends upward in a generally vertical direction to a position conveniently located for the driver's hand control.

The conventional position of the engine unit is such that the gear-shift lever mounting usually cuts through into the central portion of the driver's compartment and interferes with passenger movement and seating comfort, especially in the three-passenger front seats now in production. In addition to the above objections to the gear-shift lever cluttering up the driver's compartment, there is usually grease and dirt on and about the lever, where it comes through the floor, smearing up one's shoes and clothing.

The controlling member is usually a small lever conveniently positioned for the driver's hand movements and the controlled member is usually another small lever or in some cases two small levers under the car floor and mounted on the transmission or engine unit at some distance from the controlling member. In the case of some vehicles with "rear engined" power, these control members are more widely separated.

Now, consider gear-shifting in itself. The conventional sliding gear transmission requires shift movements in two approximately parallel arcs or paths; it further requires selection or cross-over from one arc or path to the other path while the gears are in neutral positions. The only way to find or know neutral positions, gear positions or anything else about shifting is by the "feel." This "feel" in gear shifting was easy enough with the old type gear-shift lever, but with certain "remote control" types much if not all sense of "feel" at the operator's controlling lever is lost.

In order to have this "feel" at its best in the "remote control" type gear-shift where the engine unit moves freely with respect to the vehicle frame and body unit, it is advisable to interpose a compensating connection, such as shown in my U. S. Patent No. 2,071,348, or in my U. S. patent application Serial No. 127,011, filed Feb. 23, 1937, to eliminate the effects of the involuntary engine movement relative to the body unit and permit the controlling member to move the controlled member freely with uniform travel and even pressure.

The "feel" of a free and easy cross-over from the low-reverse shifting arc or path to the second-third shifting arc or path is desirable for good shifting. It is also desirable to avoid the use of parts sliding through supporting bearings or shifting levers and bearings requiring perfect alignment and costly accuracy in manufacture.

In the present production of motor vehicles there are many "remote controls" in which much or all sense of the "feel" is lost, due to the sliding of shafts along their axes through bearings, the sliding of flexible shafts through casings and the connecting up of links at bad angles for working pressures and motor movements.

For the purpose of illustrating and describing my invention I will show it in connection with a steering column, at least the upper point of support being on the steering column, the lower point of support may be on the steering column, the frame or even "floated" with respect to the steering column and held in working position with a link connection to motor, as shown in my U. S. Patent No. 2,071,348.

One of the main objects of this invention is to provide a control mechanism of the "remote control" type in which the controlling member transmits to the operator's hand practically the same "feel" as in the controlled member or members.

A further object of this invention is to provide a control mechanism having a rotatable main shaft free to move substantially along its axis without sliding through bearings or other unnecessary entanglements.

A further object of this invention is to provide a control mechanism adapted to operate a single link for selection and shifting with the cross-over parts located at or in the transmission, or adapted to operate two links with the cross-over parts located at the lower end of the main shaft.

A further object of this invention is to provide a control mechanism having a main shaft carried controlling lever mounted to rotate about the axis of a supporting fulcrum member and also swing about an axis which is transverse to the axis of the fulcrum member to move said main shaft axially with respect to the fulcrum member.

A further object of this invention is to provide a control mechanism having a controlling lever pivotally connected between a rotatably and slidably mounted main shaft and an axially fixed fulcrum member, whereby said controlling lever is adapted to move said main shaft axially and to rotate it in more than one position along its axis.

A further object of this invention is to provide a control mechanism having a main shaft pivotally connected at its top end to a member journalled on the steering column and at its bottom end journalled in a member pivotally connected to the steering column, both of the above pivot connections arranged to permit main shaft axial movements along its axis of rotation.

Further objects and advantages of this invention will become apparent as the description proceeds, reference being made to the drawings wherein I have illustrated certain preferred forms of my invention, and in which:

Figs. 1, 3 and 5 are views in side elevation showing three types of my gear shifts attached to steering columns and link connected to transmissions.

Fig. 2 is an enlarged detail view in section on line 2—2 of Fig. 1.

Fig. 4 is an enlarged sectional view taken on line 4—4 of Fig. 3.

Fig. 6 is an enlarged sectional view taken on line 6—6 of Fig. 5.

Fig. 7 is an enlarged sectional view taken on line 7—7 of Fig. 5.

Fig. 8 is an enlarged sectional view taken on line 8—8 of Fig. 5.

Fig. 9 is a sectional view taken on line 9—9 of Fig. 1.

Referring to the drawings, the tubular main shaft 1 in Fig. 1 is mounted generally parallel to the steering column 10, and carries at its top end a controlling member 4, see Fig. 2, pivoted at 5 to the main shaft extension 8. This extension 8 is preferably welded integral with the tubular main shaft 1 and is of an inverted U-section, forming a guide in which the controlling member 4 pivots up and down about the point 5. The inner ball 6 of the controlling member 4 lies substantially in the axis of the main shaft 1 and seats in a cross hole 7 of the fulcrum plug 3, which is fitted to slide and rotate freely within the upper end of the main shaft 1.

This fulcrum plug 3 is restrained from movement along its axis by the threaded connection to the screw 12, which is fixed rigidly to the supporting extension 11 of the steering column 10. This fulcrum plug 3 may rotate on the thread of the screw 12 when the main shaft carried controlling member 4 is rotated, or it may be rigidly fixed to the steering column 10 provided the cross hole 7 is chamfered enough and properly positioned to permit the inner ball end 6 of the controlling member 4 to rotate without side interference in the cross hole 7 when the controlling member 4 rotates the main shaft 1 through the necessary arc for shifting.

The spring 9 reacts against the plug 3 tending to urge the shaft 1 downwardly.

The bottom end of the main shaft 1 preferably has a bent end 2 with a free rotating thread bearing in the cross block casting 13, which is pivoted to the clevis upper end of J-lever 14. This J-lever 14 is carried in an upright bearing member 16, which has a horizontal pivot connection 17 to the frame bracket 18.

The lower portion of the J member 14, which extends inwardly toward the engine unit 22 and terminates with a threaded end in the cross block casting 19, serves as the actual shifting lever and is connected by means of the link 20 to the ball lever 21 in the transmission 22. This link and ball lever construction is shown in my U. S. Patent No. 2,071,348 and my co-pending U. S. patent application Serial No. 127,011, filed Feb. 23, 1937.

When J member 14 swings about its upright axis in bearing 16, it moves link 20 fore and aft to shift gears, and when J member 14 in bearing 16 swings about the pivot connection 17 it rotates link 20 for selection or cross-over, while gears are in neutral positions.

With the assembly as shown in Figs. 1, 2 and 9, when the outer end of the controlling member 4 is in down position in plane of the main shaft 1 and cross-over spring 9 is extended, then the J member 14 is swung counter-clockwise about pivot 17 and the outer end of the ball lever 21 is raised, so that the second-third shift may be accomplished by rotating the controlling member 4 about the axis of the main shaft 1. When outer end of the controlling member 4 is in up position in plane of the main shaft 1 and the cross-over spring 9 is compressed, then J member 14 is swung clockwise about pivot 17 and the outer end of ball lever 21 is lowered so that the first-reverse shift may be accomplished by rotating controlling member 4 about axis of the main shaft 1.

In Fig. 1, the J member 14 is shown with the lower lever end in the cross block casting 19 bent to the right for the sake of making the drawing more easily comprehended. In Fig. 9 the lower lever end in cross block casting 19 is in a better neutral position to split the shift travel each side of center; however, many J members are actually in use, bent back as in Fig. 1, to avoid interference with exhaust manifolds on certain V-type engines.

The above described gear shift, having a single continuous connection from the hand to the cross-over within the transmission, has the advantage of lower cost, better cross-over and cross-over alignment without link adjustments, and is free from outside tampering and locking up of gears, as common in the two-lever types.

In Fig. 3, the main shaft 51 is mounted generally parallel to the steering column 60. At the bottom end of the main shaft 51 there is a driving pin 64 projecting through the main shaft, and adapted to clutch into notches in the shift levers 65 and 66. The shift lever 65 connects to the second-third transmission lever 70 on the transmission 71 through the link 69, and the shift-lever 66 connects to the first-reverse transmission lever 68 on the transmission 71 through the link 67. The lower end of the main shaft 51 is slidably and rotatably carried in the cast bearing 58. The stamping 72 holds the shifting levers 65 and 66 in place adjacent the casting 58. The controlling member 54, more clearly shown in Fig. 4, is pivoted within the tubular side extension of the main shaft 51 at 55. The inner ball end 56 lies substantially in the axis of the main shaft 51 and seats in the cross hole 57 of the fulcrum plug 53. The fulcrum plug 53 is fitted to slide and rotate freely in the upper end of the tubular main shaft 51, but is restrained from axial movement by the nut 62 holding it seated in the upper steering column casting 61. The fulcrum plug 53 also seats radially on the resilient bearing 63.

The compression spring 59 reacts against the bottom of the fulcrum plug 53 to force the main shaft 51 downward.

When the outer end of the controlling member 54 is in the down position in plane of the main shaft 51, the cross-over spring 59 is extended, the main shaft 51 is downward along its axis and the driving pin 64 clutches shift lever 65. Now, swinging the controlling member 54 about axis of the main shaft 51, causes shifting into second and third gears. When the gears are in neutral positions and the notches in the shift levers 65 and 66 are lined up so that the driving pin 64 may engage either notch, then an upward movement of the outer end of the controlling member 54 in plane of the main shaft 51 causes main shaft 51 to move upward along its axis and the driving pin 64 to clutch the shifting lever 66. Now, swinging the controlling member 54 about the axis of the main shaft 51 causes shifting into first and reverse gears.

In Fig. 5 the main shaft 81 is mounted generally parallel to the steering column 90. It rotates for shifting gears and moves along its axis for selection or cross-over. The controlling member 84, see Fig. 6, is a hollow stamping pivoted to the fulcrum plug 83 at point 86 and pivoted to the bent end of the main shaft 81 at point 85. The fulcrum plug 83 is threaded into the fixed steering column bracket 97. With this mounting for the upper end of the main shaft 81, the movements of the controlling member 84 produce the same movements in the main shaft 81 as the previously described controlling members produced in their main shafts. The shift lever 87 is integral with the main shaft 81 and is connected by the shift link 88 to the transmission shift lever 89 on the transmission 96.

Referring to both Figs. 5 and 7, the lower end 91 of the main shaft 81 is journalled for rotation in the flexibly mounted bearing 98 carried in the stamping 92 which is pivoted to the steering column 90 at the fixed pivot point 93. This stamping 92 has a lever extension 92—A connected to the forward end of the cross-over link 94 and the rear end of the cross-over link 94 is connected to the cross-over lever 95 on the transmission 96. Referring to Fig. 8, it is seen that the stamping 92 is sturdily pivoted on axis 93 to the steering column 90 so that the main shaft 81 cannot move laterally.

When the outer end of the controlling member 84 is in the down position in plane of the main shaft 81, then the main shaft is in the down position along its axis and the stamping 92 is slightly rotated counter-clockwise about the pivot point 93 and the cross-over lever 95 is pushed counter-clockwise to select second-third shift elements in the transmission 96. Now, swinging the controlling member 84 around the axis of the main shaft 81, causes shifting to second or third gears. If the controlling member 84 is in the neutral gear position, then upward movement of its outer end in plane of the main shaft 81 will raise the main shaft 81 along its axis and slightly rotate stamping 92 clockwise to pull the cross-over lever 95 clockwise and select low-reverse shift elements in the transmission 96. Now, swinging the controlling member 84 around the axis of the main shaft 81 causes shifting to first or reverse gears.

The solid rod main shaft 81 shown in Figs. 5, 6, 7 and 8 is a cheaper construction but lacks the clean-cut appearance of the tubular shaft type.

Although preferred embodiments of the invention have been described in considerable detail, those skilled in the art will appreciate that various modifications and adaptations of my invention to other uses can be made without departing from the spirit and scope thereof. It is, therefore, to be understood that my invention is not limited to the specific disclosures herein, or in any manner other than by the appended claims when given the range of equivalents to which my patent may be entitled.

I claim:

1. In a control mechanism including a steering column with a controlling member, a transmission with a controlled member, link and shaft connections between said controlling member and said controlled member including an arm fixed on said shaft operatively connected to a mid portion of said controlling member whereby the travel of the controlling member produces corresponding travel in the controlled member and means rotatably supported on said column and supporting said shaft and supporting said controlling member for pivotal movement about one end thereof on a pair of closely adjacent axes, one of said axes being in substantial alignment with the axis of the shaft and the other of said axes being transverse to the axis of the shaft.

2. In combination with a steering column, a slidably and rotatably mounted main shaft having a side extension rigid therewith, a fulcrum member in substantial alignment with said main shaft and rotatably mounted on said steering column and supporting said shaft and having freedom of movement relative to said steering column permitting alignment with said shaft, a controlling member operatively connected to said side extension at a point spaced from the axis of said shaft and operatively connected to said fulcrum member, said controlling member adapted to swing with said main shaft side extension about the main shaft axis of rotation to rotate said main shaft, and being pivotally movable about its point of connection with said fulcrum member about an axis transverse to and closely adjacent to said shaft axis of rotation whereby to impart longitudinal motion to said shaft through the said side extension thereof.

3. In a controlling mechanism, a fulcrum plug pivotally mounted on a steering column with its axis generally parallel to the steering column, a main shaft substantially coaxially mounted with respect to said fulcrum plug axis and supported by said plug and adapted to move substantially along and rotate about said axis, a controlling member adapted to swing about an axis closely adjacent to and transverse to the fulcrum plug axis and also swing about the fulcrum plug axis, connections between said controlling member, fulcrum plug and main shaft including an arm fixed at one end to said main shaft and operatively connected at its other end to a mid portion of said controlling member whereby said controlling member moves said main shaft substantially along and rotates it about said fulcrum plug axis.

4. In a control mechanism including a steering column, a controlling member, a transmission having a controlled member, said controlling member mounted to pivot about its inner end on a pair of closely adjacent transverse axes with its outer actuating end having an H-travel for selecting gear shifting elements and shifting same, means including a rotatable and axially movable shaft and an operative connection to said controlled member whereby the H-travel of said controlling member is proportionally reproduced at the outer end of said controlled member, and means supporting the end of said shaft adjacent said controlling member interposed between said steering column and said shaft and rotatable with said shaft and with respect to said steering column and supported on said steering column with freedom to be self-aligning with said shaft.

5. A control mechanism in combination with a steering column and shifting elements, a controlling member, a controlled member mounted remote from said controlling member, means whereby said controlling member actuates said controlled member to select shifting elements and shift same, comprising a slidably and rotatably mounted main shaft adjacent steering column and connecting means between said shaft and said controlled member, and means rotatably supported on said steering column and supporting said shaft and supporting said controlling member for pivotal movement of said member about one end thereof about the axis of rotation of said shaft and for pivotal movement about the same end of said member about an axis transverse to and closely adjacent to the axis of rotation of said shaft, whereby said controlling member actuates said controlled member to select shifting elements and shift the same.

6. In a remote control mechanism, a main shaft adapted to be moved longitudinally and rotatably to transmit longitudinal and rotary force and motion, a fixed support adjacent one end of said shaft, an arm extending laterally from said end of said shaft in fixed relation thereto with the end of the arm spaced from the axis of said shaft, a lever extending transversely of said shaft adjacent said arm with its inner end disposed adjacent the axis of rotation of said shaft and its outer end lying beyond the end of said arm remote from the axis of rotation of said shaft, and means rotatably associated with said fixed support and supporting said main shaft and supporting the said inner end of said lever as a fulcrum constrained against substantial movement toward or away from the axis of rotation of said shaft and from substantial movement in the direction of said axis relative to said fixed support, the end of said arm being operatively connected with a mid-portion of said lever whereby to move rotatably therewith about the axis of rotation of said shaft to rotate said shaft and whereby to permit relative angular movement between said arm and said lever transverse to the direction of said rotary movement to move said shaft longitudinally.

7. A remote control gear shifting and selecting mechanism for a transmission having instrumentalities to be controlled from a steering column comprising a main shaft adapted to be moved longitudinally and rotatably to transmit longitudinal and rotary force and motion, a fixed support carried by said column adjacent one end of said shaft, an arm extending laterally from said end of said shaft in fixed relation thereto with the end of the arm spaced from the axis of said shaft, a lever extending transversely of said shaft adjacent said arm with its inner end disposed adjacent the axis of rotation of said shaft and its outer end lying beyond the end of said arm remote from the axis of rotation of said shaft, means rotatably associated with said fixed support and supporting said main shaft and supporting the said inner end of said lever as a fulcrum constrained against substantial movement toward or away from the axis of rotation of said shaft and from substantial movement in the direction of said axis relative to said fixed support, the end of said arm being operatively connected with a mid-portion of said lever whereby to move rotatably therewith about the axis of rotation of said shaft to rotate said shaft and whereby to permit relative angular movement between said arm and said lever transverse to the direction of said rotary movement to move said shaft longitudinally, and means for transmitting force and motion from said shaft to said instrumentalities.

8. In a remote control mechanism, a controlling member and a controlled member, actuating connections between said members comprising, a fixed support, a rotatable and slidable shaft with an integral side arm, a connection from said shaft to said controlled member, said side arm associated with said controlling member to transmit torque and having its outer end pivoted to a mid portion of said controlling member to transmit longitudinal movement to said shaft, a rotatable fulcrum connection between said fixed support and said shaft and the inner end of said controlling member restraining the latter to swing on its inner end about two closely adjacent axes, one of said axes being in substantial alignment with said shaft and the other transverse thereto.

CYRUS B. KURTZ.